United States Patent [19]
Uchino

[11] 3,828,621
[45] Aug. 13, 1974

[54] BICYCLE DRIVES
[76] Inventor: Kunio Uchino, 410-10 Oaza Miyake, Fukuoka, Japan
[22] Filed: May 14, 1973
[21] Appl. No.: 360,038

[52] U.S. Cl. ........................................... 74/243 PC
[51] Int. Cl. ............................................. F16h 55/30
[58] Field of Search ....................... 74/243 PC, 411

[56] References Cited
UNITED STATES PATENTS
3,260,125   7/1966   Dolza ............................ 74/243 PC
3,304,924   2/1967   Dolza ......................... 74/243 PC X
3,443,449   5/1969   Kotarski ............................ 74/411 X

*Primary Examiner*—Leonard H. Gerin
*Attorney, Agent, or Firm*—Brisebois & Kruger

[57] ABSTRACT

A bicycle in which the pedals drive the sprocket wheel through intermediate spring means so as to provide drive from energy stored in the springs at dead center positions.

2 Claims, 3 Drawing Figures

PATENTED AUG 13 1974     3,828,621

BICYCLE DRIVES

SUMMARY OF THE INVENTION

This invention relates to an improvement in bicycle drives which results in easier and higher speed operation.

It is a most important property of bicycles that they be capable of being propelled at high speed with light pedalling, and therefore in conventional bicycles, much consideration is given to the design or structure relating to the dimensions and angular positions of each part, the selection of the position at which the center of gravity of a rider is maintained, and so on, in order to use the power supplied by the rider to the gear cranks as effectively as possible. However, it is necessary that there are certain limitations on the extent of such adjustments.

It is the principal object of the invention to provide a bicycle on which the power exerted by the rider on the pedals is more effectively used to revolve the rear wheel regularly by means of its unique structure.

It is another object of the present invention to provide a bicycle having a special and unique structure which can be easily driven because of the action of a spring installed between the sprocket wheel and gear crank.

It is still another object of the invention to provide a bicycle in which the gear cranks always impart uniform revolution to the sprocket wheel regardless of the position of the pedals.

For a better understanding of the invention, reference may be had to the following detailed description taken in conjunction with the accompanying drawings, in which.

Figure 1:
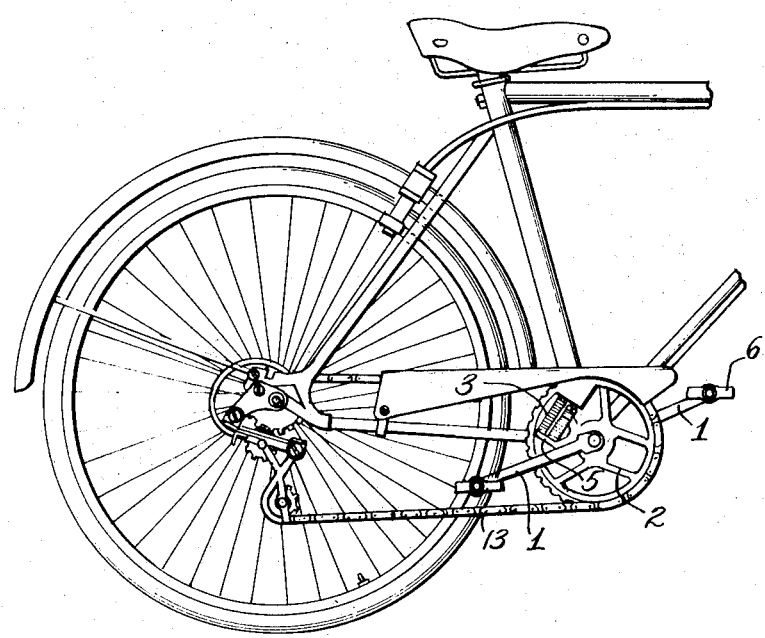
FIG. 1 is a side view of a bicycle in accordance with the present invention.
Figure 2:
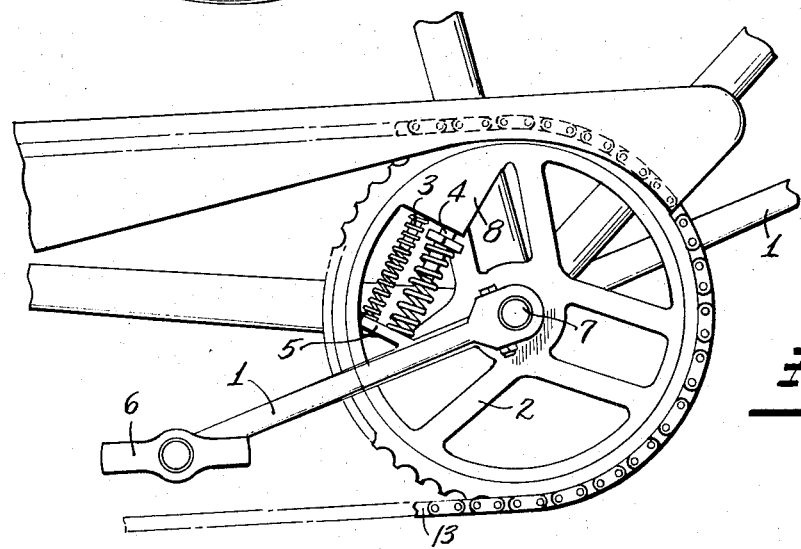
FIG. 2 is an enlarged side view showing the portion of the bicycle embodying the improvement according to the present invention.
Figure 3:
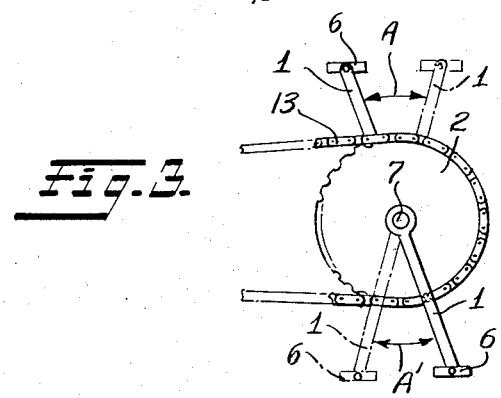
FIG. 3 is an explanatory view showing the dead center positions of the gear cranks.

Referring now to FIGS. 1–3, unlike conventional bicycles, gear cranks 1 are not fixed to a sprocket wheel but are mounted on the hub portion of said sprocket wheel 2 by means of an axle 7 so that the sprocket wheel may rotate with respect to the gear cranks. A projection 8 extends from the inside of the rim of the sprocket wheel to support springs 3, and one of the gear cranks 1 is designed to have a projection 5 for pressing the springs against said projection. One end of the spring is connected to the projection 8 and the distance between the projections 5 and 8 never exceeds the length of the springs. The gear crank 1 drives the sprocket wheel 2 through the springs 3. Either a coil or leaf spring can be employed, and when a coil spring is used a screw 4 may be provided for regulating the extent of its compression. Pedals 6 drive the gear cranks 1.

In the usual structure of bicycles, two gear cranks extending in opposite directions are rotated about the axle 7 by power supplied to each pedal. At this time, since the sprocket wheel is conventionally fixed to the gear cranks and designed to rotate as a unit with the gear cranks, uniform power is not applied to the sprocket wheel at all positions of the cranks. Two dead center positions, A, A' exist, i.e., two positions opening directly above and directly below the axle 7. It is only because of inertia that the sprocket wheel and the rear wheel connected thereto by the driving chain revolve when the gear cranks reach this dead center position, — the pedalling force is ineffective at this point.

On the contrary, in the present invention, the springs 3 gradually contract as the gear crank rotates forward around the shaft, and the power stored in the contracted springs is released when the gear crank reaches its dead center position, in which rider's pedalling power normally cannot drive the gear crank. Thus by including the device according to the invention in a bicycle, the gear crank can provide the sprocket wheel with more nearly regular and equal movement at all of its angular positions around the gear axle.

According to operation of the invention as described above, rotary movement is continuously imparted to the sprocket wheel by the gear cranks through the spring whenever the cranks rotate, even in the dead center position, and the sprocket wheel rotates constantly, since the energy stored in the spring is converted into rotary movement at said position. This movement of the sprocket wheel is transmitted by the chain 13 to the rear wheel. Consequently, the rear wheel also rotates uniformly and equally so as to decrease frictional resistance against the road.

Further, there are advantages in that the invention does not require the rider to use excessive power which causes fatigue because a larger proportion of the power applied to the gear cranks is supplied to the sprocket wheel, and the bicycle itself excels in speed and propelling power, and shocks occuring when the gear crank and the sprocket wheel are fixed to each other to move together are mitigated.

Such spring means according to the present invention may also be installed at the rear wheel. Then, the spring will be interposed between projections from the rear wheel and from a disk on which a rear sprocket wheel is attached. In this manner, the desired result can be obtained even though the spring means is positioned at the rear wheel.

What is claimed is:

1. A device for driving the driven chain of a bicycle, said device comprising
   a rotatably mounted sprocket wheel for engaging said chain,
   crank arms mounted on opposite sides of said sprocket wheel to rotate about the same axis as said sprocket wheel, and
   resilient means connecting said crank arms and sprocket wheel.

2. A device as claimed in claim 1 in which said crank arms extend in opposite directions, and said resilient means are coil springs compressed between projections on said sprocket wheel and crank arms.

* * * * *

UNITED STATES PATENT OFFICE
CERTIFICATE OF CORRECTION

Patent No. 3,828,621          Dated August 13, 1974

Inventor(s) KUNIO UCHINO

It is certified that error appears in the above-identified patent and that said Letters Patent are hereby corrected as shown below:

[30]     Foreign Application Priority Data

May 15, 1972       Japan . . . 47-47813

Signed and sealed this 29th day of October 1974.

(SEAL)
Attest:

McCOY M. GIBSON JR.                 C. MARSHALL DANN
Attesting Officer                   Commissioner of Patents